(12) United States Patent
Olson

(10) Patent No.: US 6,376,996 B1
(45) Date of Patent: Apr. 23, 2002

(54) WARNING LIGHT SYNCHRONIZATION

(75) Inventor: John F. Olson, Deep River, CT (US)

(73) Assignee: Whelen Engineering Company, Inc., Chester, CT (US)

( * ) Notice: Subject to any disclaimer, the term of this patent is extended or adjusted under 35 U.S.C. 154(b) by 0 days.

(21) Appl. No.: 09/561,998

(22) Filed: May 1, 2000

(51) Int. Cl.⁷ ................................................ F21S 3/00
(52) U.S. Cl. .................... 315/241 S; 362/222; 362/228
(58) Field of Search .......................... 315/241 S, 241 P, 315/241 R, 178, 182, 183, 245, 227 R, 208; 362/221, 222, 225, 228, 235, 236, 245

(56) References Cited

U.S. PATENT DOCUMENTS 6,155,694 A * 12/2000 Lyons et al. ............. 315/241 S
6,160,356 A * 12/2000 Shimada ................. 315/241 S

* cited by examiner

*Primary Examiner*—Don Wong
*Assistant Examiner*—Wilson Lee
(74) *Attorney, Agent, or Firm*—Alix, Yale & Ristas, LLP

(57) ABSTRACT

The gating of energizing current flow to a relatively low intensity light source is controlled by monitoring the flow of energizing current to an associated strobe light. The controller produces gating control pulses which lead the strobe energization signals to thereby cause the strobe generated light to be superimposed on light from the low intensity source.

14 Claims, 2 Drawing Sheets

WARNING LIGHT SYNCHRONIZATION

BACKGROUND OF THE INVENTION

1. Field of the Invention

The present invention relates to the exercise of control over a strobe light and one or more switched direct current supplies and, particularly, to synchronizing the energization of a high intensity directional light and a comparatively low intensity light which illuminates a zone. More specifically, the present invention is directed to a control for plural warning lights and, especially, to apparatus which achieves the sequential energization of a relatively low intensity light source and a spatially separated high intensity light source. Accordingly, the general objects of the present invention are to provide novel and improved methods and apparatus of such character.

2. Description of the Prior Art

It has been found that, under certain operating conditions, the visibility of a warning light system may be enhanced by causing energization of a high intensity warning light, namely a strobe which employs a gaseous discharge tube, subsequent to, but during, the period of energization of an associated light of lower intensity. The lower intensity light, an incandescent lamp or an array of light emitting diodes for example, will thus produce light which, in effect, floods a zone and the light from the subsequently energized strobe will be superimposed on the light from the lower intensity source. For a discussion of operating environments wherein such control of plural, diverse type light generators is particularly desirable, reference may be had to copending application Ser. No. 09/150,851 entitled "Composite Warning Light With Emission Pattern Matching", the copending application being assigned to the assignee of the present invention.

There are many applications where it is desired to emulate the operational mode achieved through use of the apparatus described in the above-referenced copending application. It may, for example, be deemed necessary or highly desirable to retrofit an existing warning light system so that the operation of a strobe lighhead included therein may synchronized with one or more auxiliary lightheads which generate lower intensity light. It may also be desired, in the course of such emulation, to present the option of employing either incandescent lamps or "instant on" devices, i.e., arrays of light emitting diodes, in the auxiliary lighthead(s). Control apparatus and methods for accomplishing such emulation have not previously been available.

SUMMARY OF THE INVENTION

The preset invention comprises a method of, and apparatus for, synchronizing the operation of light generators of diverse type such the establishment of a conductive path(s) between a direct current source(s) and a light generator(s) will be offset in time from the energization of a gaseous discharge tube, i.e., a strobe. In a preferred embodiment, a light source, particularly a relatively low intensity source which effectively floods a zone with light, will be connected to a gated direct current supply. Apparatus in accordance with the invention is responsive to the energization of the gaseous discharge tube to produce control signals. These control signals are processed to cause gating of the direct current supply, and thus energization of the associated low intensity light source(s), a preselected period of time before the gaseous discharge tube is energized.

BRIEF DESCRIPTION OF THE DRAWINGS

The present invention may be better understood, and its numerous objects and advantageous will become apparent to those skilled in the art, by reference to the accompanying drawings wherein like reference numerals refer to like elements in the figures and in which.

DESCRIPTION OF THE DISCLOSED EMBODIMENT

Figure 1:
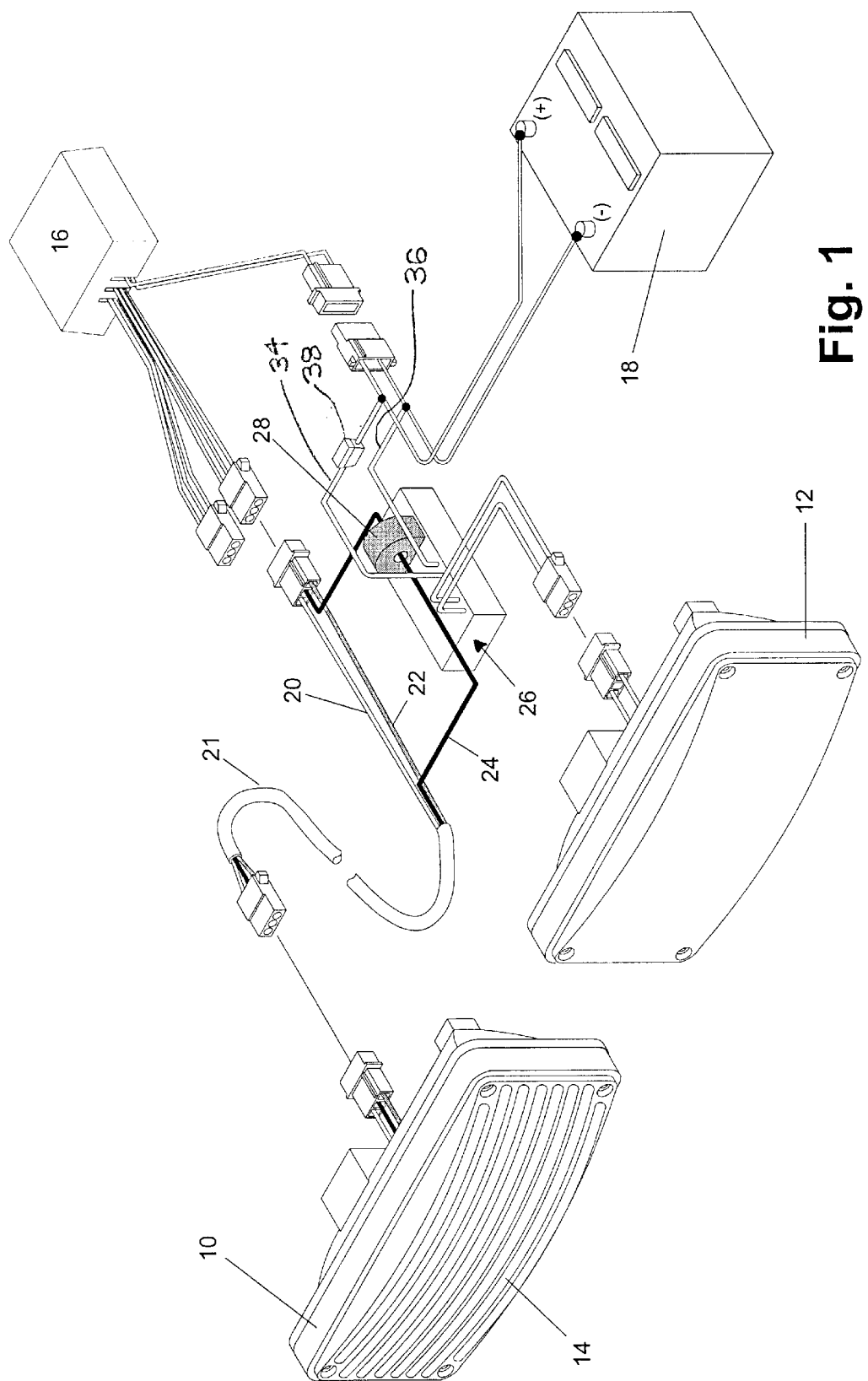
FIG. 1 is a perspective view of apparatus in accordance with a preferred embodiment of the invention in a typical operational environment.

FIG. 1 represents utilization of the present invention to synchronize the operation of a pair of adjacently mounted lightheads. Thus, FIG. 1 depicts a strobe lighthead 10 and an auxiliary lighthead 12. The strobe lighthead will typically comprise a linear flash tube having an anode, a cathode and a trigger electrode. The flash tube will be positioned on the linear focal point of a parabolic trough reflector and the generated light will be focused into a high intensity band by the reflector. The strobe lighthead 10, in the disclosed embodiment, also includes a lens 14 which is provided with optics which further shape the generated light into a desired radiation pattern. Energization of strobe lighthead 10 is controlled by a strobe power supply 16. The power supply 16 will, in the typical vehicular operating environment, be connected to a low voltage direct current source, i.e., the vehicle's battery 18. Strobe power supply 16 will have the capability of producing pulse trains which are delivered via conductor 20 of a multiconductor cable 21 to the trigger electrode of the flash tube. The anode and cathode of the flash tube will be connected respectively to the proper polarity high voltage terminals of power supply 16 by conductors 22 and 24 of cable 21. In response to application of a trigger pulse, the Xenon gas in the linear flash tube will break down and current will flow, via the ionized gas, between the anode and cathode of the flash tube.

The auxiliary lighthead 12 will employ a light generator which has the ability of illuminating a zone with light which is less intense than that which originates from a gaseous discharge tube, i.e., a strobe. Thus, the light generator in auxiliary lighthead 12 may comprise an incandescent lamp, especially a halogen lamp, or an array of closely spaced light emitting diodes which, when simultaneously energized, produce significant light flux. A direct current source, i.e., the vehicle's battery 18, is connected to the light generator in auxiliary lighthead 12 via a controller indicated generally at 26. The circuitry comprising controller 26, which in effect is a switched direct current supply, will be described in more detail below in the discussion of FIG. 2. Continuing to refer to FIG. 1, controller 26 includes a current sensing transformer 28. In the disclosed embodiment, the conductor 24 which extends between the strobe power supply 16 and the cathode of the flash tube in lighthead 10 will extend through transformer 28 and thus function as the primary winding of the transformer. Accordingly, whenever the flash tube is "fired", i.e., whenever current flows through the ionized gas in the flash tube, a signal will be induced in the secondary winding of transformer 28.

Figure 2:
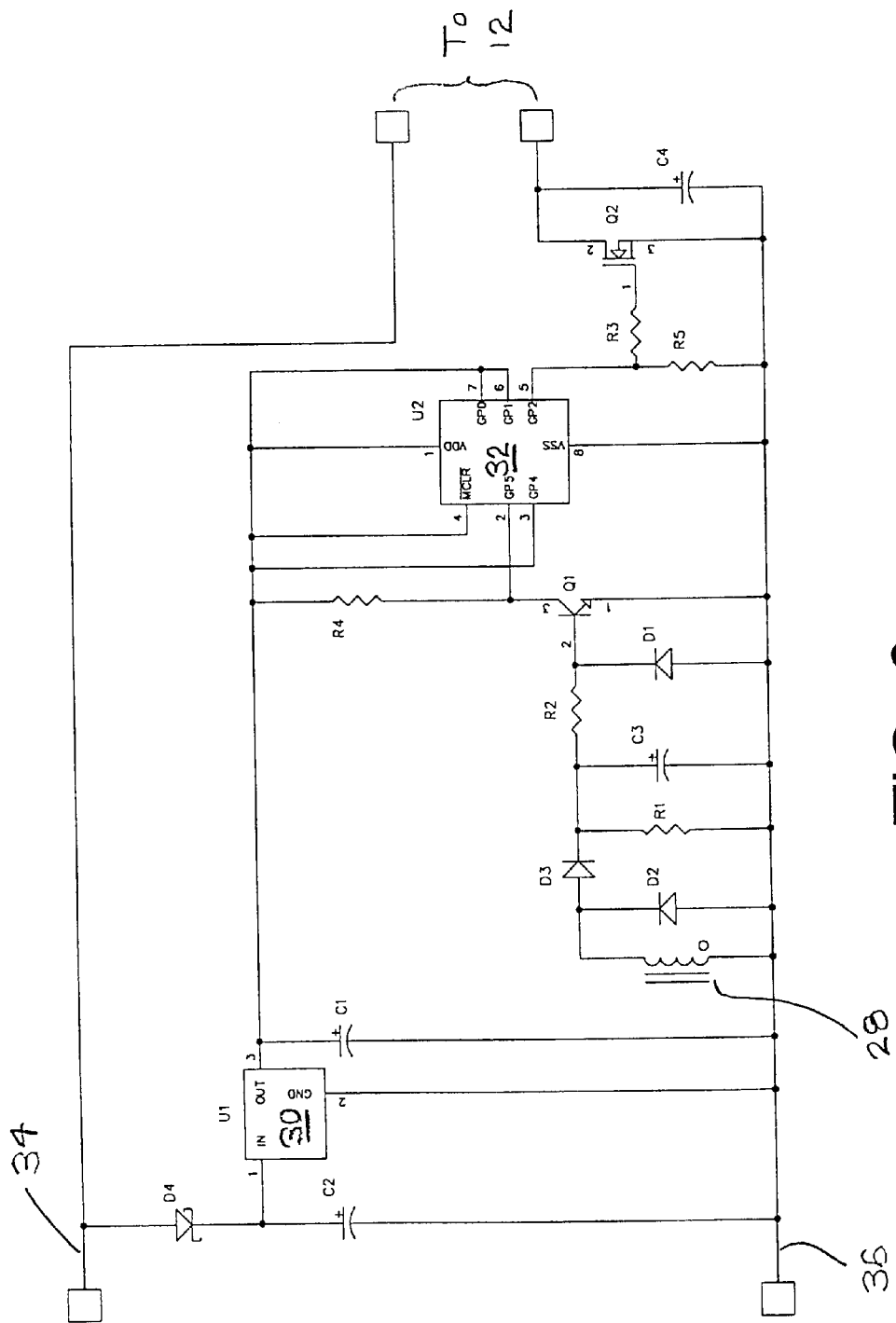
FIG. 2 is a schematic diagram of the control circuit of the apparatus of FIG. 1.

With reference now to FIG. 2, in addition to the current sense transformer 28, the controller 26 includes an input voltage regulator 30, a pulse shaping circuit which includes a transistor Q1, a microcontroller 32 and an output switch. In the disclosed embodiment the output switch comprises MOSFET Q2. The source voltage is delivered to controller 26 via conductors 34 and 36, a fuse 38 (FIG. 1) being connected in conductor 34. The voltage regulator 30, in combination with a series connected Zener diode D4 and a capacitor C2, provides a regulated voltage for operation of microcontroller 32. This regulated voltage is further filtered by capacitor C1. Conductor 34 extends through controller 26 to the auxiliary lighthead 12 and thus provides an electrical connection between the light generator(s) in lighthead 12 and a first polarity terminal of the power supply 18. The connection between the opposite polarity conductor 36 and auxiliary lighthead 12 is interrupted by normally open, solid state switch Q2, i.e., energizing current can flow through the light generator(s) in the auxiliary lighthead 12 only when solid state switch Q2 is in the closed state.

The signals periodically induced in the winding of current sense transformer 28 are processed and applied to the base of transistor Q1. Diode D2 is the reset or "catch" device for transformer 28, while diode D3 rectifies the pulses induced in the transformer secondary winding. Diode D1, in the known manner, protects the base of Q1. Capacitor C3 is a storage device which lengthens the gating signals applied to the base of Q1. Resistors R1 and R2 define a voltage divider with R1 acting as a load on the transformer and R2 limiting current in the transistor base circuit. Thus, C3, R1 and R2 define an RC filter.

The flow of current through the gaseous discharge tube in strobe lighthead 10 will, in the disclosed embodiment, result in a positive signal being applied to the base of Q1. Transistor Q1 will thus be turned on, current will flow through resistor R4 and an input signal, i.e., a shaped timing pulse, will be applied to the sensing input of microcontroller 32. Microcontroller 32, in one reduction to practice of the invention, comprised a Microchip Technology, Inc. type PIC12CE519-04 I/P which includes EPROM, EEPROM, RAM, I/O, timer, internal oscillator and watchdog circuit.

Microcontroller 32 is programmed such that it will produce control pulses for switch Q2. These control pulses will be generated a predetermined period before each firing of the flash tube in strobe lighthead 10, i.e., each control pulse will be offset from a flash tube trigger pulse. Each firing of the flash tube will cause the application of an input signal to the control input of microcontroller 32. The microcontroller will determine the repetition rate of the trigger pulses supplied by strobe power supply 16. Thus, in accordance with a stored program, microcontroller 32 will determine the spacing between successive trigger pulses and will cause the closing of switch Q2 a predetermined period before the energization of the gaseous discharge tube in the strobe lighthead 10. Achievement of the desired synchronization of the gating of switch Q2 and the firing of the strobe will take from two to five cycles of the strobe flash pattern and, obviously, the strobe and auxiliary lighthead will "fire" simultaneously the first time the strobe is energized after the system has been turned on. Once synchronization has been achieved, the light pulses generated by the flash tube will be superimposed on the light generated by the auxiliary lighthead 12.

It should be noted that the lead time or offset of the gating of switch Q2 will be a function of the type of light generator employed in auxiliary lighthead 12. Thus, the offset time may be made greater for an incandescent lamp, when time is required for the filament of the lamp to reach operating temperature, than for an LED array.

It should also be noted that microcontroller 32 will be programmed with a threshold time, typically on the order of 125 ms, such that it controls operation of switch Q2 only in response to the first of a series of closely spaced pulses, i.e., second and succeeding closely spaced trigger pulses of multi-flash bursts will be ignored. Accordingly, the system has the ability to operate in a mode where, during each energization of the auxiliary lighthead 12, the strobe lighthead 10 will produce two or more closely spaced high intensity light pulses.

While a preferred embodiment has been shown and described, various modifications and substitutions may be made thereto without departing from the spirit and scope of the invention. Accordingly, it is to be understood that the present invention as been described by way of illustration and not limitation.

What is claimed is:

1. Apparatus for synchronizing the operation of a strobe light with an auxiliary light generator of diverse type, the strobe light including a gaseous discharge tube which is periodically energized whereby current flows therethrough and light pulses are serially generated in accordance with a preselected flash pattern, said apparatus comprising:

means for sensing current flow through a gaseous discharge tube and generating periodic signals commensurate therewith;

means for shaping said periodic signals to produce spaced timing pulses;

controller means responsive to said timing pulses for determining the spacing therebetween and generating gating control signals of preselected duration which lead said timing pulses by a predetermined interval; and normally open switch means connected between a source of direct current and an auxiliary light generator, said switch means being responsive to said gating control signals whereby light pulses generated by the strobe light will be superimposed on light emitted by the auxiliary light generator.

2. The apparatus of claim 1, wherein the auxiliary light generator is an incandescent lamp.

3. The apparatus of claim 1, wherein the auxiliary light generator comprises an array of light emitting diodes.

4. The apparatus of claim 1, wherein said controller means is responsive only to timing pulses which are spaced apart by a preselected minimum threshold time enabling the strobe light to be energized a plurality of times during the duration of a gating control signal.

5. The apparatus of claim 4, wherein said switch means comprises a solid state switch.

6. The apparatus of claim 1, wherein said means for sensing current flow comprises a transformer having at least a primary winding and a secondary winding, said primary winding being connected in series with the gaseous discharge tube and said secondary winding being connected to said shaping means.

7. The apparatus of claim 6, wherein said controller means is responsive only to timing pulses which are spaced apart by a preselected minimum threshold time enabling the strobe light to be energized to generate plural light pulses during the duration of a gating control signal.

8. The apparatus of claim 7, wherein said switch means comprises a solid state switch.

9. The apparatus of claim 8, wherein said shaping means includes:

a filter circuit connected to said transformer secondary winding; and a normally open electronic switch comprising a transistor connected between said filter circuit and said controller means, said electronic switch being switched to a closed state in response to filtered periodic signals.

10. The apparatus of claim 9, wherein said controller means comprises a programmable microcontroller.

11. The apparatus of claim 10, wherein the auxiliary light generator is an incandescent lamp.

12. The apparatus of claim 10, wherein the auxiliary light generator comprises an array of light emitting diodes.

13. A method for synchronizing the operation of a strobe light with an auxiliary light generator of diverse type, the strobe light including a gaseous discharge tube which is periodically energized whereby current flows between an anode and cathode thereof and light pulses are thereby serially generated in accordance with a preselected flash pattern, said method comprising the steps of:

monitoring the supply of current to a gaseous discharge tube;

generating a shaped timing pulse each time the monitored current is commensurate with energization of the gaseous discharge tube;

determining the time duration between the start of successive of said timing pulses; and gating the flow of direct current to an auxiliary light generator a preselected period of time before the expected initiation of each timing pulse after said time duration has been determined whereby the auxiliary light generator will be energized and will produce light prior to the generation of a light pulse by the strobe light.

14. The method of claim 13, further comprising disregarding determined time durations less than a preselected minimum enabling multiple light pulses to be produced by the strobe light during the time of energization of the auxiliary light generator.

\* \* \* \* \*